United States Patent

Matsuno

Patent Number: 6,163,747
Date of Patent: Dec. 19, 2000

[54] ROAD FRICTION COEFFICIENT DETECTING APPARATUS AND METHOD THEREOF

[75] Inventor: Koji Matsuno, Tokyo, Japan

[73] Assignee: Fuji Jukogyo Kabushiki Kaisha, Tokyo, Japan

[21] Appl. No.: 09/154,282

[22] Filed: Sep. 16, 1998

[30] Foreign Application Priority Data

Sep. 25, 1997 [JP] Japan ................................. 9-260614

[51] Int. Cl.$^7$ ....................................................... B60T 7/12
[52] U.S. Cl. ................................ 701/80; 701/72; 701/73; 303/146
[58] Field of Search .............................. 701/80, 72, 73, 701/89, 92; 180/197, 446; 303/140, 146, 150

[56] References Cited

U.S. PATENT DOCUMENTS

| | | | |
|---|---|---|---|
| 4,852,951 | 8/1989 | Matsuda | 303/159 |
| 5,216,608 | 6/1993 | Ito et al. | 364/426.03 |
| 5,388,046 | 2/1995 | Anan et al. | 364/424.05 |
| 5,731,976 | 3/1998 | Tsuyama et al. | 364/426.09 |
| 5,819,194 | 10/1998 | Hara et al. | 701/89 |

FOREIGN PATENT DOCUMENTS 82274  1/1996  Japan .

Primary Examiner—William A. Cuchlinski, Jr.
Assistant Examiner—Marthe Y. Marc-Coleman
Attorney, Agent, or Firm—Martin A Farber

[57] ABSTRACT

A road friction coefficient detecting apparatus and method of a vehicle includes a vehicle data calculating section, a tire characteristic initial value judging section and a road friction coefficient estimating section. In the vehicle data calculating section, parameters needed for the calculation of road friction coefficients are established based on signals from a steering wheel rotation angle sensor, a vehicle speed sensor and a yaw rate sensor. The tire characteristic initial value judging section sends a signal to establish parameters corresponding to a low friction coefficients to the vehicle data calculating section, when road condition sensing means such as an outside air temperature, a rain fall sensor and the like detect a road surface having a relatively low friction coefficient. When the road condition sensing means detect a road surface having a relatively high friction coefficient, the tire characteristic initial value judging section sends a signal to establish parameters corresponding to a friction coefficient immediately before the previous stop of the vehicle. In the road friction coefficient estimating section a road friction coefficient is calculated based on these parameters according to the adaptive control theory.

16 Claims, 12 Drawing Sheets

ROAD FRICTION COEFFICIENT DETECTING APPARATUS AND METHOD THEREOF

BACKGROUND OF THE INVENTION

1. Field of the Invention

The present invention relates to an apparatus and a method for detecting a road friction coefficient and more particularly to an apparatus for detecting a proper road friction coefficient according to road conditions.

2. Description of the Prior Art

In recent years, numerous vehicle control technologies such as a traction control technology, a braking force control technology, a torque distribution control technology and the like, have been proposed and some of them have been realized in actual automobiles.

In many of these vehicle control technologies, road friction coefficients are essential control parameters and it is a key technology to find an accurate road friction coefficient. In Japanese Patent Application Laid-open No. Toku-Kai-Hei 8-2274, the applicant of the present invention proposes a technique in which an estimated road friction coefficient is calculated based on a steering angle $\delta$, vehicle speed V, a yaw rate $\gamma$ and other parameters in accordance with a so-called adaptive control theory.

According to the technique disclosed in the patent No. Toku-Kai-Hei 8-2774, a road friction coefficient can be estimated by estimating a tire characteristic on the basis of time based on the comparison of a yaw and lateral motion model with a yaw or lateral motion of the actual vehicle.

However, in this estimation method of the road friction coefficient, since the calculation is executed through integration based on an estimated initial value, if the estimated initial value is inproper, it takes a long time to reach a final estimated value and this adversely affects the responsibility of the road friction coefficient detecting apparatus. Further, this estimation method has a problem of that it is difficult to estimate a proper road friction coefficient due to the uneveness of road surfaces, when the vehicle travels on rough roads, because this estimation method needs repeated inputs of yaw responses to steering operations.

SUMMARY OF THE INVENTION

Thus, in order to solve the aforesaid problems, it is an object of the present invention to provide a road friction coefficient detecting apparatus capable of estimating a road friction coefficient with good accuracy and good responsibility.

According to one aspect of the present invention, a road friction coefficient detecting apparatus of a vehicle comprises a vehicle motion data detecting means for detecting lateral motion indicative data of the vehicle, a road surface condition data detecting means for detecting road surface condition indicative data, a vehicle data calculating means for calculating parameters to estimate respective cornering powers of front and rear wheels of the vehicle according to an equation of motion on the basis of the lateral motion indicative data, a road friction coefficient estimating means for estimating the cornering powers of front and rear wheels based on the parameters and for calculating a road friction coefficient estimated value based on the cornering powers and a tire characteristic initial value judging means for estimating a road surface condition based on the road surface condition indicative data when it is judged that the vehicle starts up after a long period of rest and for outputting a signal to establish an initial value of the parameters to the vehicle data calculating means.

Further, according to another aspect of the present invention, a road friction coefficient detecting apparatus of a vehicle comprises a vehicle motion data detecting means for detecting lateral motion indicative data of the vehicle, a lateral acceleration sensor for detecting actual lateral acceleration indicative data of the vehicle, a vehicle data calculating means for calculating parameters to estimate respective cornering powers of front and rear wheels of the vehicle according to an equation of motion on the basis of the lateral motion indicative data, a road friction coefficient reference value calculating means for applying a low-pass filter process to the actual lateral acceleration indicative data and for calculating a road friction coefficient reference value based on the low-pass filter processed data, and a road friction coefficient estimating means for estimating respective cornering powers of front and rear wheels based on said parameters calculated in the vehicle data calculating means and for calculating a road friction coefficient mid-estimated value based on the cornering powers and for establishing a road friction coefficient estimated value by comparing the road friction coefficient mid-estimated value with the road friction coefficient reference value.

DETAILED DESCRIPTION OF PREFERRED EMBODIMENTS

Figure 1:
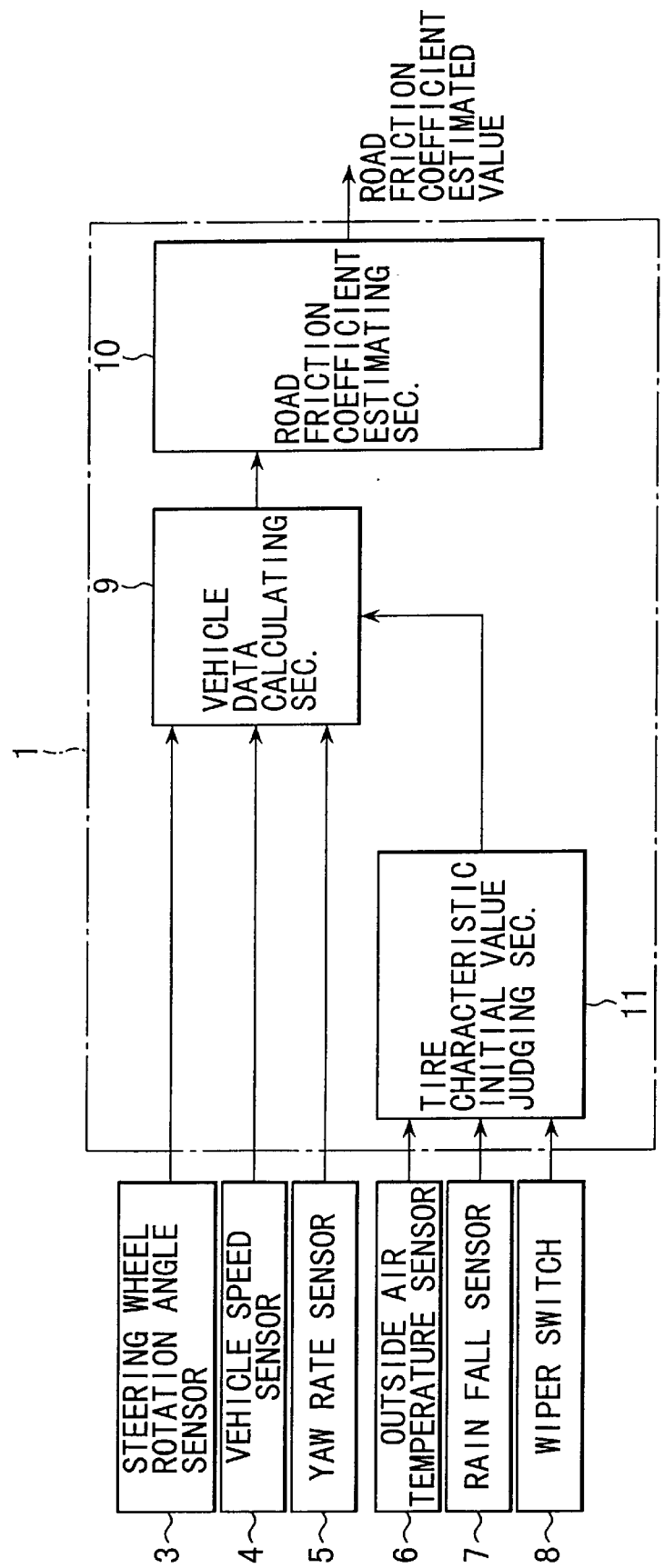
FIG. 1 is a functional block diagram of a road friction coefficient apparatus according to a first embodiment of the present invention.

Referring now to FIG. 1, reference numeral 1 denotes a road friction coefficient detecting apparatus mounted on a vehicle. The road friction coefficient detecting apparatus 1 receives signals from a steering wheel rotation angle sensor 3, a vehicle speed sensor 4, a yaw rate sensor 5, an outside air temperature sensor 6, a rain fall sensor 7, a wiper switch 8 and the like. Based on these signals, an estimated road friction coefficient E is calculated and outputted to a vehicle control apparatus such as a traction control apparatus, a braking force control apparatus, a torque distribution control apparatus and the like.

Here, the steering wheel rotation angle sensor 3, the vehicle speed sensor 6 and the yaw rate sensor 7 form a vehicle motion data detecting means and the outside air temperature sensor 6, the rain fall sensor 7 and the wiper switch 8 form a road surface condition data detecting means.

The road friction coefficient detecting apparatus 1 comprises a vehicle data calculating section 9, a road friction coefficient estimating section 10 and a tire characteristic initial value judging section 11.

The vehicle data calculating section 9 to which the steering wheel rotation angle sensor 3, the vehicle speed sensor 4 and the yaw rate sensor 5 are connected calculates parameters needed for subsequent calculations based on an equation of motion using a steering wheel rotation angle $\theta_H$, a vehicle speed V and a yaw rate $\gamma$ which are inputted from these sensors.

Figure 2:
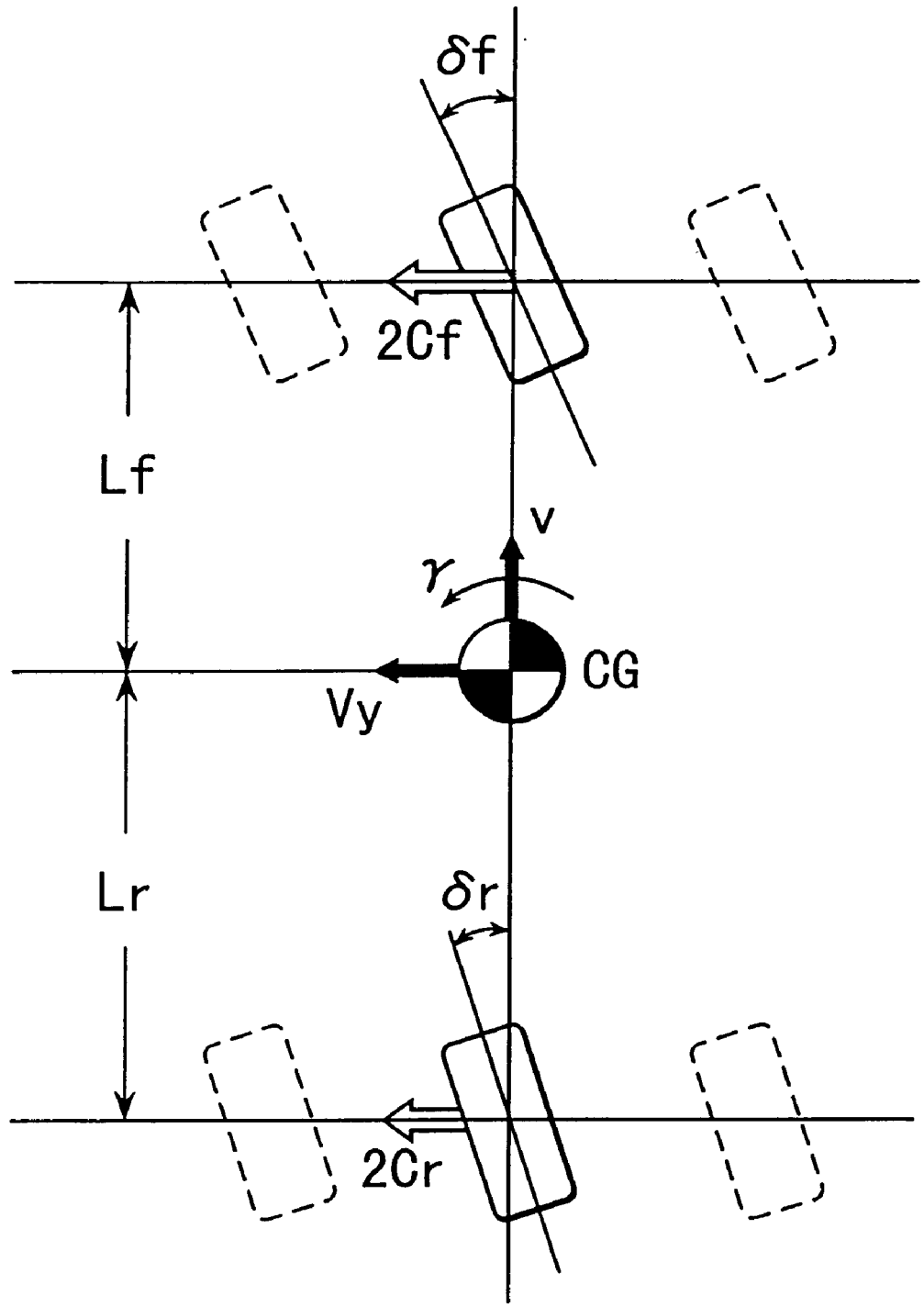
FIG. 2 is a diagram showing a two-wheel vehicle model for explaining a lateral motion of the vehicle.

First, using a vehicular motion model shown in FIG. 2, an equation of lateral motion of the vehicle is obtained. The equation of lateral motion of the vehicle is:

$$2 \cdot C_f + 2 \cdot C_r = M \cdot G_y \tag{1}$$

where $C_f$, $C_r$ are cornering forces of front and rear wheels, respectively; M is mass of the vehicle; and $G_y$ is lateral acceleration.

On the other hand, an equation of rotational motion around gravity center of the vehicle is expressed as:

$$2 \cdot C_f L_f - 2 \cdot C_r \cdot L_r = I_z \cdot (d\gamma/dt) \tag{2}$$

where $L_f$, $L_r$ are distances from the center of gravity to the front and rear wheels respectively; $I_z$ is yaw moment of inertia of the vehicle and $d\gamma/dt$ is yaw angular acceleration.

A lateral acceleration $G_y$ is expressed as:

$$G_y = (dV_y/dt) + V \cdot \gamma \tag{3}$$

where V is vehicle speed; $V_y$ is lateral slip velocity and $\gamma$ is yaw rate.

Further, although the cornering forces $C_f$, $C_r$ have a response similar to a first-order time lag, if this time lag is neglected, the cornering forces $C_f$, $C_r$ are expressed as:

$$C_f = K_f \alpha_f \tag{4}$$

$$C_r = K_r \cdot \alpha_r \tag{5}$$

where $K_f$, $K_r$ are cornering powers of the front and rear wheels, respectively and $\alpha_f$, $\alpha_r$ are lateral slip angles of the front and rear wheels, respectively.

When an idea of an equivalent cornering power is introduced in consideration of the effects of the roll of the vehicle or those of the suspension system, the lateral slip angles $\alpha_f$, $\alpha_r$ are expressed as:

$$\alpha_f = \delta_f - \{(V_y + L_f \gamma)/V\} = (\theta_H/n) - \{(V_y + L_f \gamma)/V\} \tag{6}$$

$$\alpha_r = \delta_r - \{(V_y - L_r \gamma)/V\} \tag{7}$$

where $\delta_f$ is steering angle of the front wheel; $\delta_r$ is steering angle of the rear wheel and n is steering gear ratio.

The equations mentioned above are fundamental equations of motion. In the vehicle data calculating section 9, miscellaneous parameters are estimated by expressing these equations as variables of state and applying a parameter adjusting method to the adaptive control theory.

Further, in the road friction coefficient estimating section 10, the cornering powers $K_f$, $K_r$ are obtained based on the parameters estimated in the vehicle data calculating section 9.

With respect to the parameters of an actual vehicle, there are a vehicle weight, a yaw moment of inertia and the like. In developing the theory, these vehicle parameters are assumed to be constant and only the cornering power is assumed to be variable. The cornering power of a tire varies according to the non-linearity of the lateral force against the slip angle, an effect of the road friction coefficient, an effect of the weight transfer and the like. Where a is a parameter estimated by the change of the yaw rate $\gamma$ and b is a parameter estimated by the front wheel steering angle $\delta_f$, the cornering powers $K_f$, $K_r$ of the front and rear wheels are expressed as follows:

$$K_f = (b \cdot I_z \cdot n)/(2 \cdot L_f) \tag{8}$$

$$K_r = (a \cdot I_z + L_f \cdot K_f)/L_r \tag{9}$$

The cornering power of the front and rear wheels $K_f$, $K_r$ in the non-linear region are estimated by substituting the vehicle speed V, the steering angle $\delta_f$ and the yaw rate $\gamma$ into the aforementioned formulas. Further, by comparing thus estimated cornering powers $K_f$, $K_r$ with those on a road surface with a high friction coefficient for respective front and rear wheels for example, a friction coefficient of the road surface is calculated according to the following equations:

$$\mu_f = K_f / K_{f0} \tag{10}$$

$$\mu_r = K_r / K_{f0} \tag{11}$$

where $\mu_f$ is a mid-estimated road friction coefficient on the front wheel side; $\mu_r$ is a mid-estimated road friction coefficient on the rear wheel side; $K_{f0}$ is a reference equivalent cornering power (equivalent cornering power on a road surface having a high friction coefficient) on the front wheel side and $K_{r0}$ is a reference equivalent cornering power on the rear wheel side.

In the road friction coefficient estimating section 10, a smaller one is selected as a road friction coefficient estimated value E from thus calculated road fiction coefficients and is outputted therefrom.

The tire characteristic initial value judging section 11 is connected with the outside air temperature sensor 6, the rain fall sensor 7 and the wiper switch 8 and is formed as a tire characteristic initial value judging means for outputting signals to determine following parameter initial values to the vehicle data calculating section 9.

In the tire characteristic initial value judging section 11, first it is judged base on signals inputted from the aforesaid sensors whether or not the road friction coefficient at the starting up of the vehicle after a long period of a rest has been lowered due to the frozen road or rain fall. If it is judged that that road friction coefficient has been lowered, a signal for replacing initial values $a_1$, $b_1$ of parameters a, b with intial values $a_L$, $b_L$ corresponding to a road surface with low friction coefficient (for example, 0.3), if it is judged that that road friction coefficient has not been lowered, a signal for initial values $a_1$, $b_1$ of parameters a, b with initial values $a_f$, $b_f$ corresponding to the estimated road friction coefficient immediately before the rest, are outputted to the vehicle data calculating section 9, respectively. The judgment whether or not the vehicle has a long rest is made by comparing an elapsed time after the vehicle speed V detected by the vehicle speed sensor 4 becomes zero until the vehicle speed V becomes a value other than zero again with a predetermined time.

Figure 3:
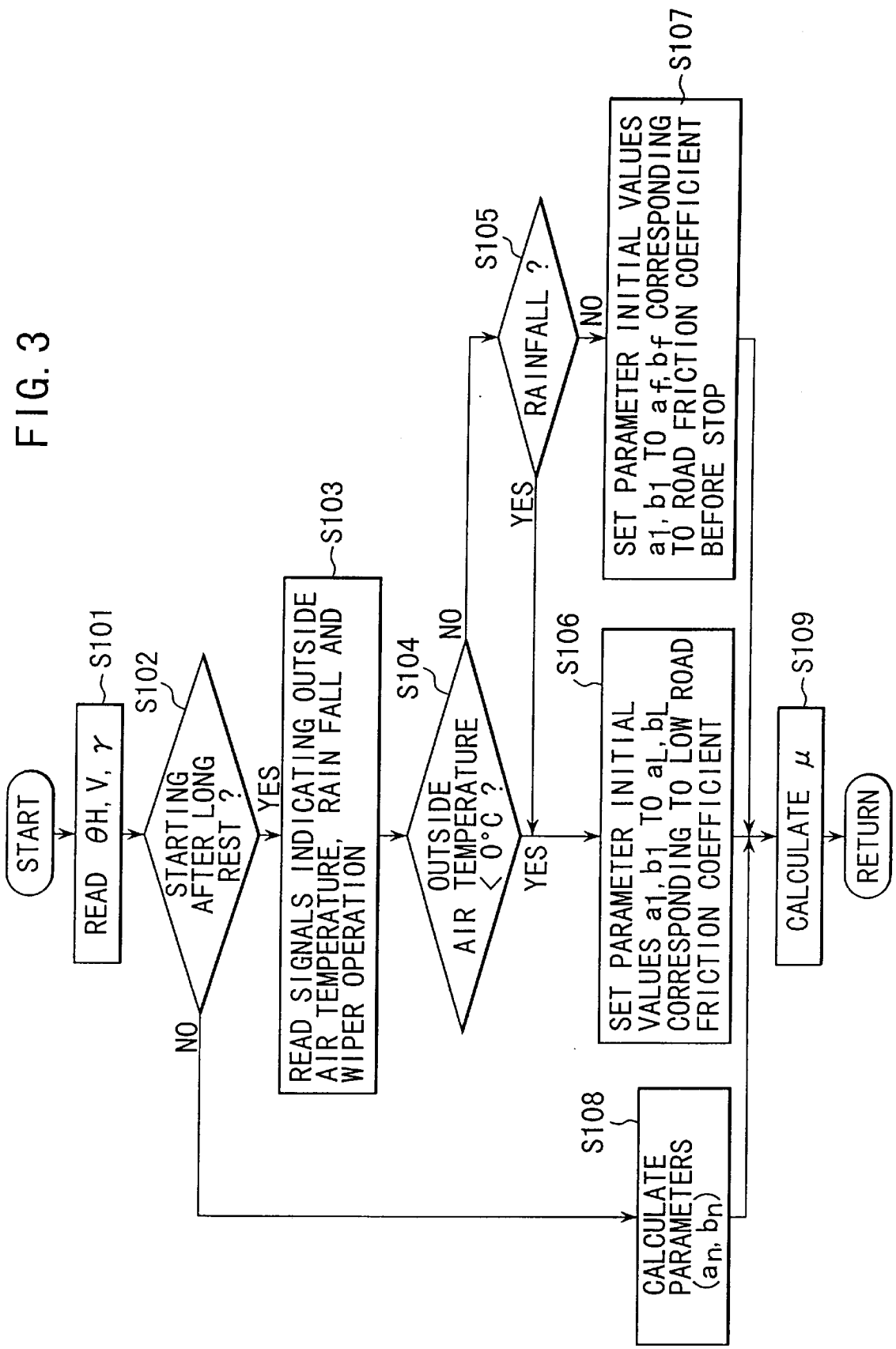
FIG. 3 is a flowchart of a routine for calculating a road friction coefficient according to a first embodiment of the present invention.

Next, the detection process of the road friction coefficient estimated value E of thus constituted road friction coefficient detecting apparatus 1 will be described using an flowchart shown in FIG. 3. This road friction coefficient detection program is carried out every specified time. When the program starts, at a step 101 a steering wheel rotation angle ($\theta_H$) indicative signal, a vehicle speed (V) indicative signal and a yaw rate ($\gamma$) indicative signal are read out from the steering wheel rotation angle sensor 3, the vehicle speed sensor 4 and the yaw rate sensor 5, respectively and the program goes to a step S102.

At the step S102, it is judged whether or not this is a starting up after a long period of rest. If it is a starting up after a long period of rest, the program goes to a step S103 and if it is a starting up other than a long period of rest (during running or a starting up after a short period of stop), the program skips to a step S108.

Steps S103 through S105 are processes performed in the tire characteristic initial value judging section 11. At a step S103, an outside air temperature indicative signal, a rain fall indicative signal and a wiper operation indicative signal are read out from the outside air temperature sensor 6, the rain fall sensor 7 and the wiper switch 8, respectively.

Next, the program goes to a step S104 wherein it is judged based on the signal from the outside air temperature sensor 6 whether or not the outside air temperature is lower than a specified temperature, for example 0° Centigrade at which the road surface may be frozen. If the outside air temperature is lower than the specified temperature, the program goes to S106 and if it is higher than the specified temperature, the program goes to a step S105.

At the step S105, it is judged based on the signal from the rain fall sensor 7 whether or not it rains presently. If it rains, the program goes to a step S106 and if it does not, the program goes to a step S107.

When the program goes to the step S106 as a result of the judgment at the step S104 that the outside air temperature is lower than the specified temperature or as a result of the judgment at the step S105 that it is raining, in the vehicle data calculating section 9, the parameter initial values $a_1$, $b_1$ are set to be of parameters $a_L$, $b_L$ corresponding to a predetermined low road friction coefficient (for example, 0.3) respectively and the program goes to a step S109.

On the other hand, when the program goes to a step S107 as a result of the judgment at the step S105 that it is not raining, in the vehicle data calculating section 9, the parameter initial values $a_1$, $b_1$ are set to be of parameters $a_f$, $b_f$ corresponding to the road friction coefficient detected immediately before the previous stop of the vehicle, respectively and the program goes to a step S109.

In this way, when the vehicle starts up after a long period of rest, it is judged whether or not the road friction coefficient is lowered from the outside air temperature and weather conditions and if it is judged that the road friction coefficient is low, the parameter initial values are set to the values corresponding to the predetermined low friction coefficient. Accordingly, even in the case where the outside air temperature becomes low and the road surface is frozen or where the road surface gets wet by rain during the long period of rest, it is possible to set the parameter initial values $a_1$, $b_1$ to values corresponding to an approximate actual road friction coefficient (low road friction coefficient).

These initial values are not necessarily set to values corresponding to 0.3 but may be set to any values corresponding to other than 0.3. Further, those may be set to a plurality of sets of values corresponding to temperature and weather conditions.

On the other hand, when the program goes from the step S102 to the step S108, according to the theory of the adaptive control, in the vehicle data calculating section 9, new parameters $a_n$, $b_n$ are estimated from the new data of the steering wheel rotation angle $\theta_H$, the vehicle speed V and the yaw rate $\gamma$ which are read at the step S101 and the program goes to the step S109.

At the step S109, in the road friction coefficient estimating section 10, substituting these parameters $a_n$, $b_n$ (n=1, 2, 3, . . . ) into a in the formula (9), and b in the formula (8), the cornering powers $K_f$, $K_r$ are obtained and the mid-estimated road friction coefficients $\mu_f$, $\mu_r$ are calculated based on these cornering powers $K_f$, $K_r$. Then, after letting the smaller one of these $\mu_f$, $\mu_r$ to be a final estimated road friction coefficient E, the program leaves the routine.

According to this embodiment, since the parameter initial values in estimating the road friction coefficient can be started with ones corresponding to an approximate actual road friction coefficient, a time needed for converging the estimated road friction coefficient E to an actual road friction coefficient can be shortened, thereby the road friction coefficient apparatus can be improved in responsibility.

Figure 4:
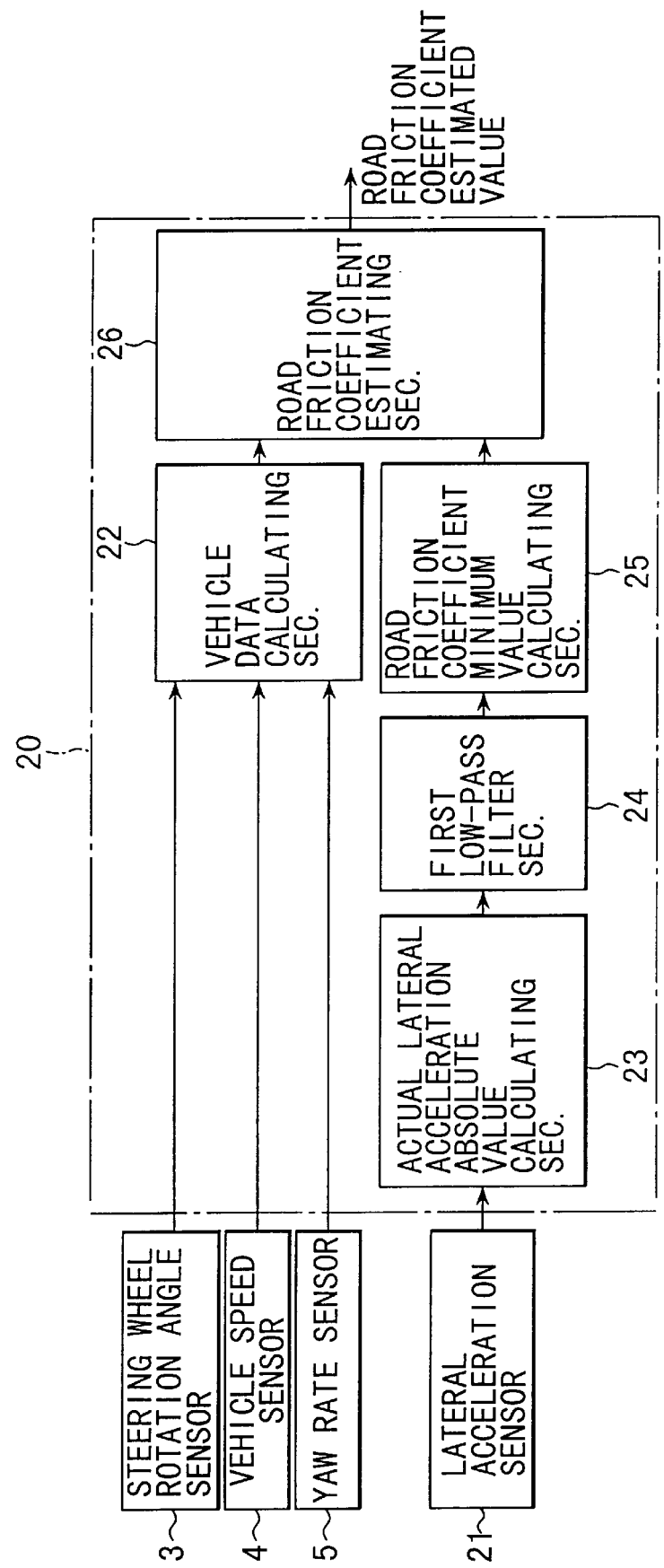
FIG. 4 is a functional block diagram of a road friction coefficient apparatus according to a second embodiment of the present invention.
Figure 5:
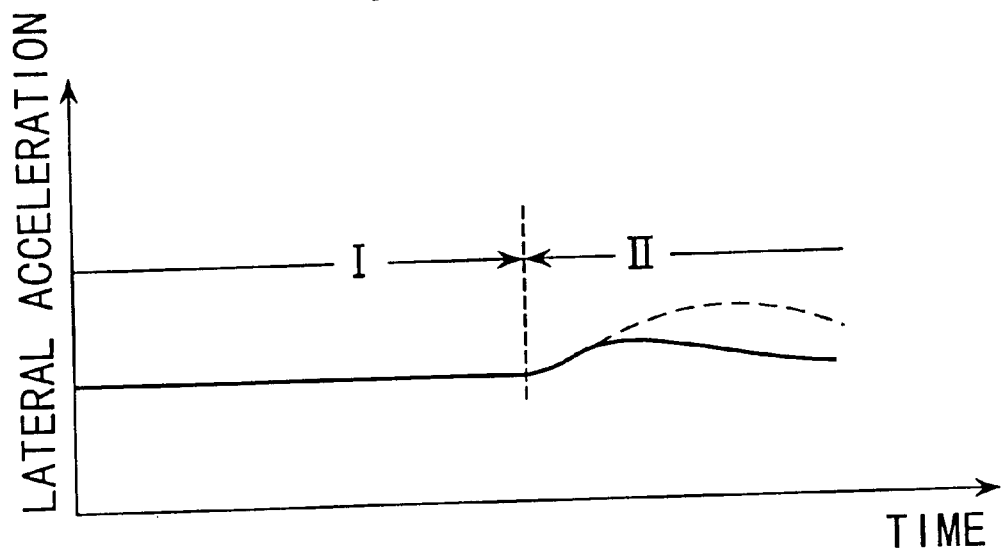
FIG. 5 is a graph showing an absolute value of a lateral acceleration passed through a low-pass filter according to a second embodiment.
Figure 6:
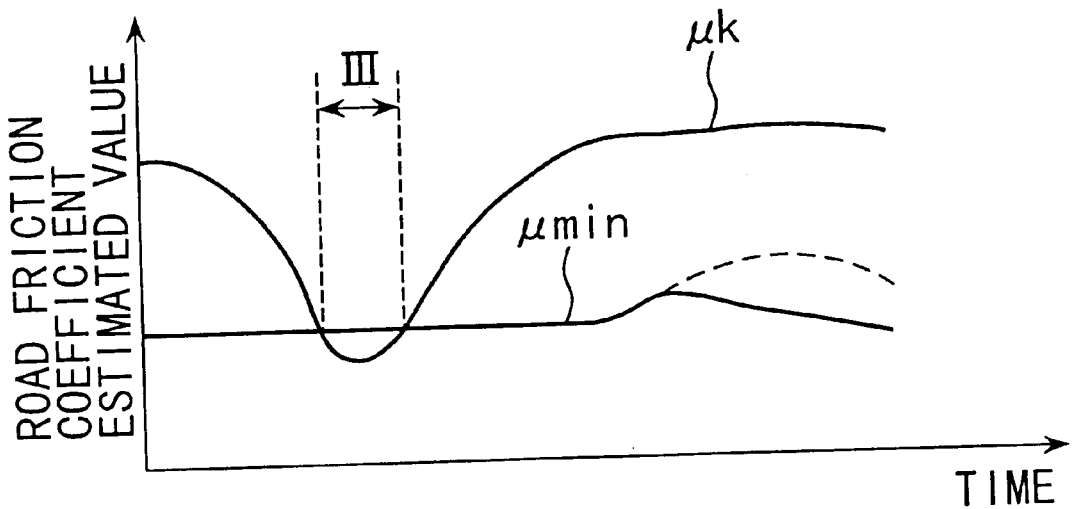
FIG. 6 is an explanatory view showing a method of calculating a road friction coefficient estimated value E according to a second embodiment of the present invention.
Figure 7:
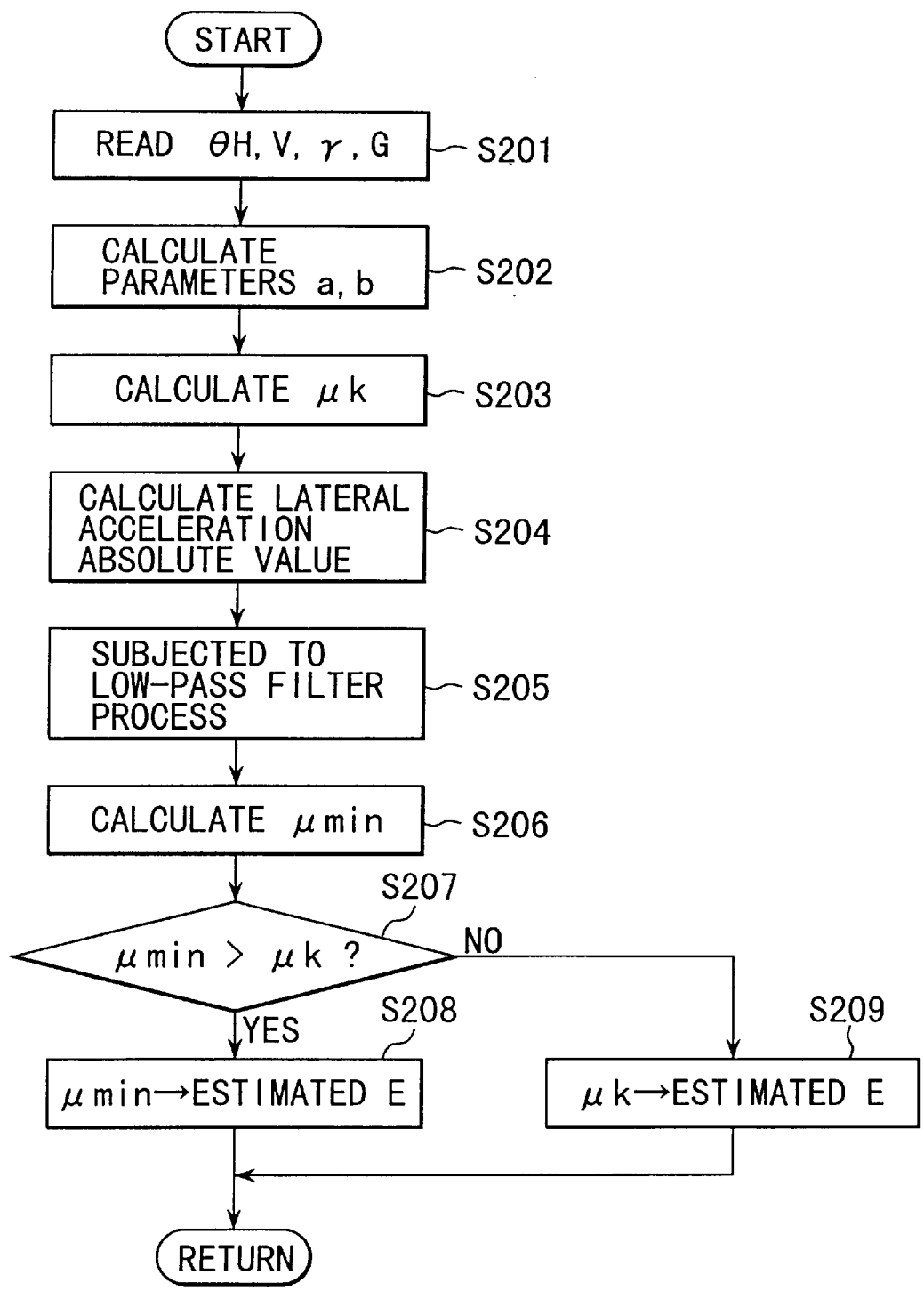
FIG. 7 is a flowchart of a routine for calculating a road friction coefficient according to a second embodiment of the present invention.

Next, FIGS. 4 through 7 show a second embodiment of the present invention, in which FIG. 4 is a functional block diagram of the road friction coefficient detecting apparatus, FIG. 5 is an explanatory view showing an absolute value of lateral acceleration processed through a low-pass filter, FIG. 6 is an explanatory view showing the method of calculating a road friction coefficient estimated value E and FIG. 7 is a flowchart showing a routine for detecting a road friction coefficient. It is an object of this embodiment to raise an accuracy of the estimated road friction coefficient E by obtaining a minimum road friction coefficient $\mu_{min}$ based on a lateral acceleration and comparing this minimum road friction coefficient with a mid-estimated road friction coefficient $\mu_k$ calculated based on the estimated cornering powers $K_f$, $K_r$ using the adaptive control theory.

Referring now to FIG. 4, a road friction coefficient detecting apparatus 20 receives signals from a steering wheel rotation angle sensor 3, a vehicle speed sensor 4, a yaw rate sensor 5 and a lateral acceleration sensor 21. The road friction coefficient estimated value E is detected based on these signals.

The road friction coefficient detecting apparatus 20 comprises a vehicle data calculating section 22, a lateral acceleration absolute value calculating section 23, a first low-pass filter section 24, a road friction coefficient minimum value calculating section 25 and a road friction coefficient estimating section 26.

The vehicle data calculating section 22 is formed as a vehicle data calculating means in which parameters a, b are estimated based on front wheel steering angle ($\delta_f$) indicative data from the steering wheel rotation angle sensor 3, vehicle speed (V) indicative data from the vehicle speed sensor 4 and yaw rate ($\gamma$) indicative data from the yaw rate sensor 5 using the adaptive control theory in the same manner as in the aforesaid first embodiment.

The absolute lateral acceleration calculating section 23, the first low-pass filter section 24 and the road friction minimum value calculating section 25 are formed as a road friction coefficient reference value calculating means. The absolute lateral acceleration calculating section 23 calculates an absolute value of the lateral acceleration based on lateral acceleration indicative data detected by the lateral acceleration sensor 21.

The first low-pass filter section 24 gets rid of noises included in the absolute data from the absolute lateral acceleration calculating section 23 and caused by road roughness and the like.

That is to say, the lateral acceleration sensor 21 is for detecting a lateral acceleration generated as a result of steering. However, it is unavoidable that the detected data of lateral acceleration contains noises largely attributed to the roughness of roads on which the vehicle travels. The first low-pass filter section 24 serves as deleting these noises from the data of lateral acceleration.

The first low-pass filter section 24 is constituted such that the cut-off frequency is set to a relatively lower value in case where the absolute value of the lateral acceleration is in an increasing tendency and is set to a relatively higher value in case where it is in a reducing tendency. As a result, when the vehicle enters from a road with even road surface into a road with rough road surface (when the vehicle goes from an area I to an area II as shown in FIG. 5), the absolute value of lateral acceleration (shown by a broken line) is corrected to a lower value from which the effect of noises is deleted, as shown by a solid line.

The road friction coefficient minimum value calculating section 25 calculate a road friction coefficient minimum value $\mu_{min}$ which is supposed at least to exist on the road surface from the absolute data of lateral acceleration processed through the low-pass filter. The road friction coefficient minimum value $\mu_{min}$ in is calculated based on the absolute value of lateral acceleration processed by the filter.

The road friction coefficient estimating section 26 is formed as a road friction coefficient estimating means in which the mid-estimated road friction coefficient $\mu_k$ is obtained based on the calculated cornering powers $K_f$, $K_r$ and when this mid-estimated road friction coefficient $\mu_k$ is compared with the abovedescribed road friction coefficient minimum value $\mu_{min}$, the larger one is selected as a road friction coefficient estimated value E.

That is, since the road friction coefficient minimum value $\mu_{min}$ is a value calculated from the lateral acceleration exerted on the vehicle, the road surface is supposed to have a road friction coefficient of the minimum value $\mu_{min}$. Therefore, when the mid-estimated road friction coefficient $\mu_k$ is lower than the road friction coefficient minimum value $\mu_{min}$, this road friction coefficient minimum value $\mu_{min}$ is selected as a road friction coefficient estimated value E. For example, in case where the mid-estimated road friction coefficient $\mu_k$ and the road friction coefficient minimum value $\mu_{min}$ are obtained as shown in FIG. 6, the road friction coefficient minimum value $\mu_{min}$ is selected as a road friction coefficient estimated value E in an area designated III and the mid-estimated road friction coefficient $\mu_k$ is selected as a road friction coefficient estimated value E in an area other than III.

Thereby, even in a case where the mid-estimated road friction coefficient $\mu_k$ obtained from the cornering powers $K_f$, $K_r$ goes down far lower than the actual road friction coefficient due to a detection error, a delay of convergence or the like, at least the road friction coefficient minimum value $\mu_{min}$ can be detected as a road friction coefficient estimated value E.

Next, the detecting process of the road friction coefficient estimated value E of thus constituted road friction coefficient detecting apparatus 20 will be described according to the flowchart shown in FIG. 7.

This detecting program is carried out every specified time during running. When the program starts, at a step S201 steering wheel rotation angle ($\theta_H$) indicative data, vehicle speed (V) indicative data, yaw rate ($\gamma$) indicative data and lateral acceleration (G) indicative data are read from the steering wheel rotation angle sensor 3, the vehicle speed sensor 4, the yaw rate sensor 5 and the lateral acceleration sensor 21, respectively and the program goes to a step S202. At the step S202, in the vehicle data calculating section 22, parameters a,b are obtained from those data using the adaptive control routine and the program goes to a step S203. At the step S203, in the road friction coefficient estimating section 26, cornering powers $K_f$, $K_r$ are obtained from those parameters a, b and a mid-estimated road friction coefficient $\mu_k$ is calculated based on these calculated cornering powers $K_f$, $K_r$.

Then, the program goes to S204 where the lateral acceleration indicative data are subjected to an absolute value calculating process. After that, the program goes to a step S205 where in the first low-pass filter section 24 the absolute value of the lateral acceleration indicative data is subjected to a low-pass filter process. Then, at a step S206, in the road friction minimum value calculating section 25, a road friction coefficient minimum value $\mu_{min}$ is calculated based on the absolute value of the lateral acceleration subjected to the low-pass filter process.

Next, the program goes to a step S207 where the road friction coefficient minimum value $\mu_{min}$ obtained from the lateral acceleration is compared with the mid-estimated road friction coefficient $\mu_k$ calculated from the cornering powers $K_f$, $K_r$. If the road friction coefficient minimum value $\mu_{min}$ is larger than the mid-estimated road friction coefficient $\mu_k$, the program goes to a step S208 where road friction coefficient minimum value $\mu_{min}$ is set as an estimated value E and the program leaves the routine.

On the other hand, if the road friction coefficient minimum value $\mu_{min}$ is equal to or smaller than the mid-estimated road friction coefficient $\mu_k$, the program goes to a step S209 where the mid-estimated road friction coefficient $\mu_k$ is set as an estimated value E and the program leaves the routine.

Thus, according to this embodiment, even if the mid-estimated road friction coefficient $\mu_k$ shows a far smaller value than the actual road friction coefficient due to measuring errors, running on rough roads and the like, the outputted road friction coefficient estimated value E never becomes lower than the road friction coefficient minimum value $\mu_{min}$.

Figure 8:
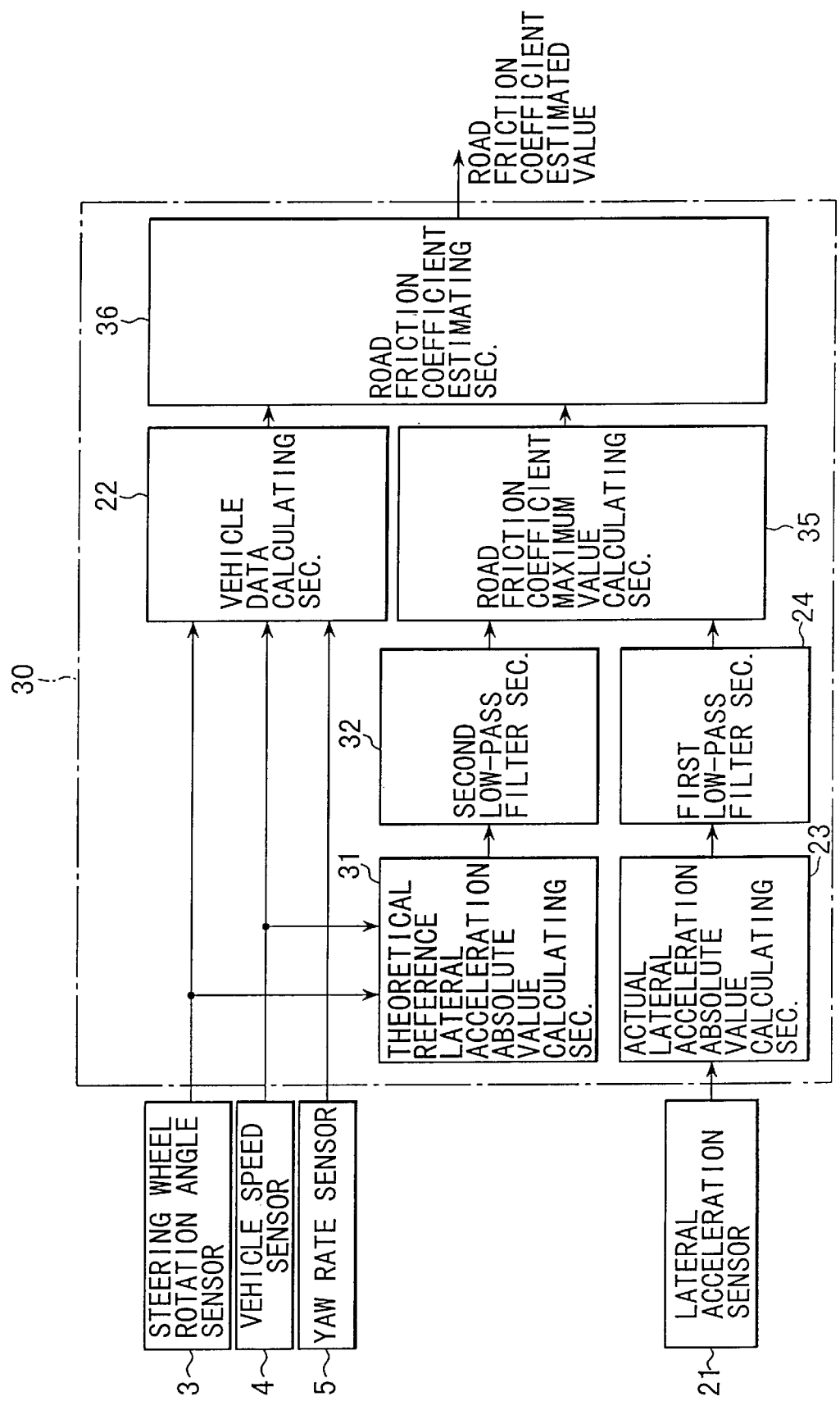
FIG. 8 is a functional block diagram of a road friction coefficient apparatus according to a third embodiment of the present invention.
Figure 9:
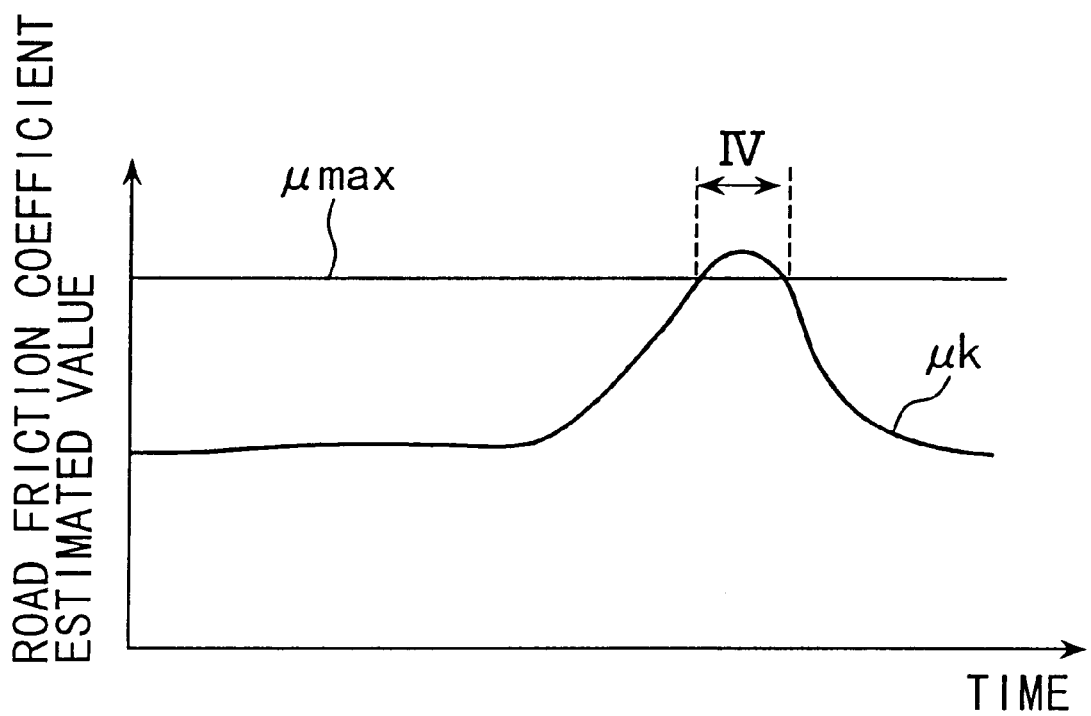
FIG. 9 is an explanatory view showing a method of calculating a road friction coefficient estimated value E according to a third embodiment of the present invention.
Figure 10:
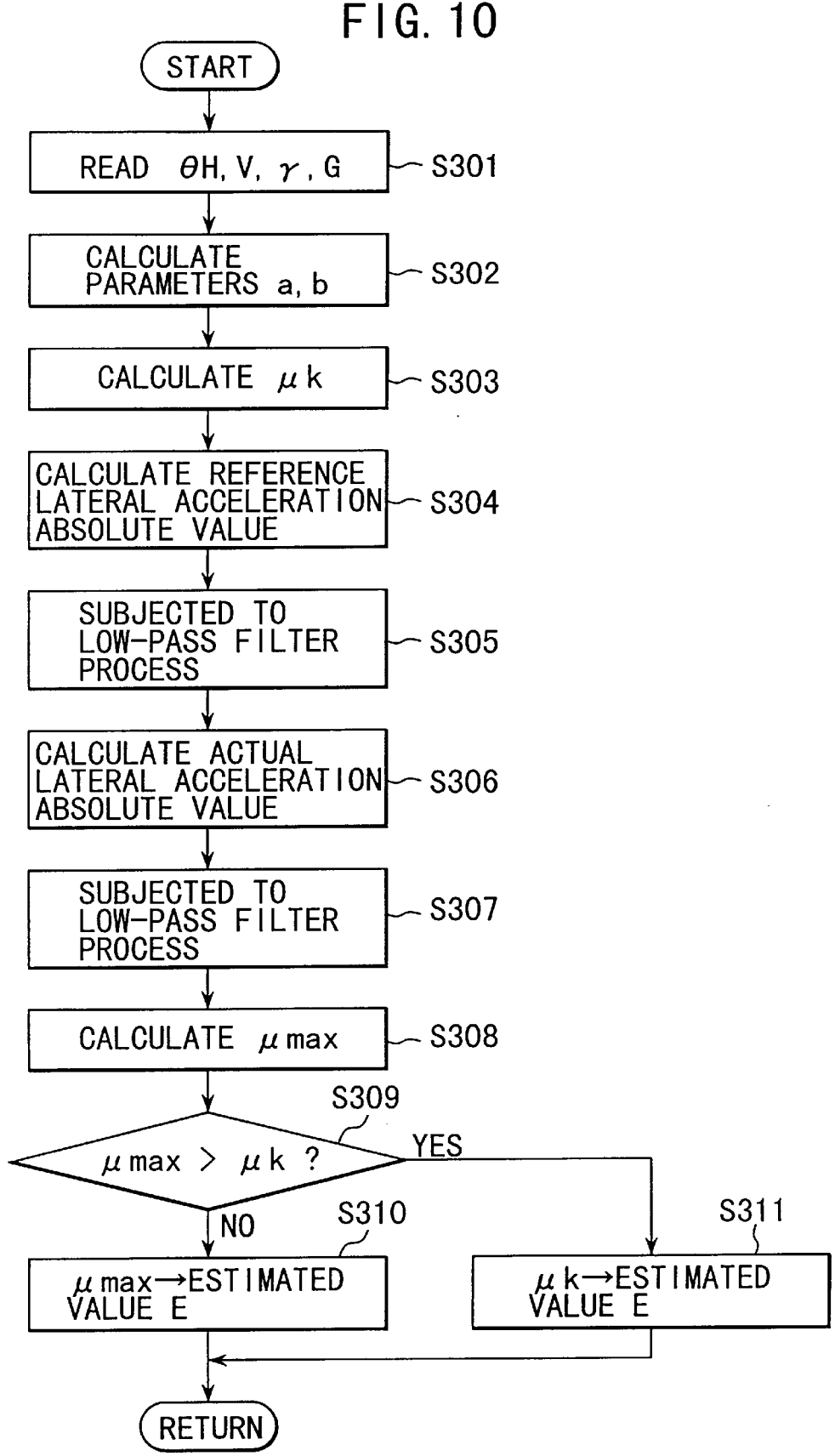
FIG. 10 is a flowchart of a routine for calculating a road friction coefficient according to a third embodiment of the present invention.

FIGS. 8, 9 and 10 relate to a third embodiment in which a road friction coefficient maximum value $\mu_{max}$ is obtained based on a lateral acceleration actually exerted on the vehicle, a steering angle $\delta_f$ of the front wheel, a reference lateral acceleration theoretically obtained from the vehicle speed and the steering angle $\delta_f$ and a road friction coefficient estimated value E is obtained by comparing this road friction coefficient maximum value $\mu_{max}$ with a mid-estimated road friction coefficient $\mu_k$ which calculated from the steering angle $\delta_f$, the vehicle speed V and the yaw rate $\gamma$ using the adaptive control theory.

Referring to FIG. 8, a road friction coefficient detecting apparatus 30 receives signals from a steering wheel rotation angle sensor 3, a vehicle speed sensor 4, a yaw rate sensor 5 and a lateral acceleration sensor 21 and detects the road friction coefficient estimated value E based on these signals.

The road friction coefficient detecting apparatus 30 comprises a vehicle data calculating section 22, a theoretical reference lateral acceleration absolute value calculating section 31, a second low-pass filter section 32, a lateral acceleration absolute value calculating section 23, a first low-pass filter section 24, a road friction coefficient maximum value calculating section 35 and a road friction coefficient estimating section 36.

The vehicle data calculating section 22 receives detecting data from the steering wheel rotation angle sensor 3, the vehicle speed sensor 4, the yaw rate sensor 5. In the same manner as in the first and second embodiments, the vehicle data calculating section 22 forms a vehicle data calculating means for estimating parameters a, b from steering wheel rotation angle ($\theta_H$) indicative data, vehicle speed (V) indicative data and yaw rate ($\gamma$) indicative data using the adaptive control theory.

The lateral acceleration calculating section 23, the second low-pass filter section 24, the theoretical reference lateral acceleration absolute value calculating section 31, the first low-pass filter section 32 and the road friction coefficient maximum value calculating section 35 form a road friction coefficient reference value calculating means.

The theoretical reference lateral acceleration absolute value calculating section 31 receives steering wheel rotation angle ($\theta_H$) indicative data and vehicle speed (V) indicative data from the steering angle sensor 3 and the vehicle speed sensor 4, respectively. Based on these data, a theoretical reference lateral acceleration is obtained and further an absolute value of this theoretical reference lateral acceleration is calculated.

The theoretical reference lateral acceleration is calculated based on the vehicle speed (V) indicative data and the steering wheel angle($\theta_H$=n·$\delta$)indicative data as follows:

Theoretical reference lateral acceleration=$\{1/(1+A\cdot V^2)\}\cdot(V^2/L)\cdot(\theta_H/n)/g$ (13)

where A is stability factor; L is wheel base; n is steering gear ratio; and g is gravitational acceleration.

The second low-pass filter section 32 receives the absolute data of the theoretical reference lateral acceleration from the theoretical reference lateral acceleration absolute value calculating section 31 and applies a low-pass filter process to remove noises included therein.

The lateral acceleration absolute value calculating section 23 receives the lateral acceleration indicative data actually exerted on the vehicle from the lateral acceleration sensor 21 and calculates an absolute value of this lateral acceleration indicative data.

The first low-pass filter section 24 receives the absolute value of the lateral acceleration indicative data from the lateral acceleration absolute value calculating section 23 and removes noises included therein through the low-pass filter process.

The road friction coefficient maximum value calculating section 35 receives the filter-processed reference lateral acceleration data from the second low-pass filter section 32 and at the same time the filter-processed lateral acceleration data from the first low-pass filter section 24. Based on these data, the road friction coefficient maximum value calculating section 35 calculates a maximum value $\mu_{max}$ which is supposed to be an upper limit value of road friction coefficients.

Herein, the road friction coefficient maximum value $\mu_{max}$ is estimated by use of the following equation:

The road friction coefficient maximum value $\mu_{max}$=(filter-processed actual lateral acceleration)/(filter-processed theoretical reference lateral acceleration) (14)

The filter-processed theoretical reference lateral acceleration is a theoretical value of the lateral acceleration which is supposed to be exerted on the vehicle when the steering wheel is turned by an angle $\theta_H$ while the vehicle is running on a road surface with $\mu$=1 of friction coefficient at the speed V. Hence, if the vehicle behaves accurately in response to the steering operation, the road friction coefficient maximum value $\mu_{max}$ will be approximately equal to 1. Therefore, the current road friction coefficient is estimated to be a value not exceeding the road friction coefficient maximum value $\mu_{max}$, letting this value be a maximum value.

The road friction coefficient estimating section 36 calculates cornering powers $K_f$, $K_r$ based on the parameters a, b estimated in the vehicle data calculating section 22 and obtains a mid-estimated road friction coefficient $\mu_k$. Further, the road friction coefficient estimating section 36 is formed as a road friction coefficient estimating means in which the road friction coefficient maximum value $\mu_{max}$ is compared with the mid-estimated road friction coefficient $\mu_k$ and the smaller one is determined to be a road friction coefficient estimated value E.

In case where $\mu_k$ and $\mu_{max}$ are obtained as shown in FIG. 9, the maximum value $\mu_{max}$ is outputted as a road friction coefficient estimated value E in an area marked IV and the mid-estimated road friction coefficient $\mu_k$ is outputted as an estimated value E in other areas.

Consequently, even if the mid-estimated road friction coefficient $\mu_k$ becomes a far higher value than the actual road friction coefficient due to a sudden change of the road friction coefficient, the estimated value E never exceeds the road friction coefficient maximum value $\mu_{max}$ and this prevents the estimated value E from producing a large detection error.

Next, the detection process of thus constituted road friction coefficient 30 will be described according to the flowchart shown in FIG. 10.

This detecting program is carried out every specified time. When the program starts, at a step S301 steering wheel rotation angle ($\theta_H$) indicative data, vehicle speed (V) indicative data, yaw rate($\gamma$)indicative data and lateral acceleration (G) indicative data are read from the steering wheel rotation angle sensor 3, the vehicle speed sensor 4, the yaw rate sensor 5 and the lateral acceleration sensor 21, respectively and the program goes to a step S302.

At the step S302, in the vehicle data calculating section 22, parameters a, b are obtained from the data of the steering wheel rotation angle $\theta_H$, the vehicle speed V and the yaw rate $\gamma$ and then the program goes to a step S303.

At the step S303, in the road friction coefficient estimating section 36, cornering powers $K_f$, $K_r$ are obtained from the parameters a, b and based on the cornering powers $K_f$, $K_r$, a mid-estimated road friction coefficient $\mu_k$ is calculated.

Then, the program goes to a step S304 wherein in the theoretical reference lateral acceleration absolute value calculating section 31 a theoretical reference lateral acceleration is obtained from the steering wheel rotation angle $\theta_H$ and the vehicle speed V and thus obtained theoretical reference lateral acceleration is subjected to the absolute value process. Then, at a step S305, in the second low-pass filter section 32, the absolute data of the theoretical reference lateral acceleration is subjected to the filter process.

Then, the program goes to a step S306 where in the lateral acceleration absolute value calculating section 23 the actual lateral acceleration data read from the lateral acceleration sensor 21 is subjected to the absolute value process.

The program goes to a step S307 where in the first low-pass filter section 24 the absolute value data is subjected to the filter process and goes to a step S308.

At the step S308, in the road friction coefficient maximum value calculating section 35, a road friction coefficient maximum value $\mu_{max}$ is calculated from the ratio of the reference lateral acceleration filter-processed at S305 to the actual lateral acceleration filter-processed at S307 and the program goes to a step S309.

At the step S309, in the road friction coefficient estimating section 36, the mid-estimated road friction coefficient $\mu_k$ obtained at S303 is compared with the road friction coefficient maximum value $\mu_{max}$ obtained at S309. If the $\mu_{max}$ is smaller than the $\mu_k$, the program goes to a step S310 wherein the $\mu_{max}$ is set to the estimated value E and the program leaves the routine.

On the other hand, if the fmax is larger than the $\mu_k$, the program goes to S311 wherein the $\mu_k$ is set to the estimated value E and the program leaves the routine.

In this way, even if the road friction coefficient estimated value $\mu_k$ shows a far larger value than the actual road friction coefficient, since the outputted road friction coefficient estimated value E never exceeds the maximum value $\mu_{ax}$ of the road friction coefficient, the detected road friction coefficient estimated value E increases its reliability.

Further, since the reference lateral acceleration passes through the low-pass filter reflecting the responsibility of the actual vehicle, a proper maximum value of the road friction coefficient can be secured.

Next, a fourth embodiment of the present invention will be described with reference to FIGS. 11, 12a, 12b, 12c and 13.

According to the fourth embodiment, similarly to the third embodiment, the road friction coefficient estimated value E is detected based on the mid-estimated road friction coefficient $\mu_k$ and the road friction coefficient maximum value $\mu_{max}$. The defect of the third embodiment is that the mid-estimated road friction coefficient $\mu_k$ is corrected responsive to every small change of behavior of the vehicle. To improve this, in the fourth embodiment, first the theoretical reference lateral acceleration calculated from the vehicle speed V and the steering wheel rotation angle $\theta_H$ is processed by two kinds of low-pass filters having different time constants. In case where the actual lateral acceleration is between outputs of these two filters having different time constants, since the vehicle is supposed to have a lateral acceleration response according to the steering operation and therefore the road friction coefficient $\mu_{max}$ is substantially larger than the mid-estimated road friction coefficient $\mu_k$, the $\mu_k$ is used without calculating the maximum value $\mu_{max}$. Further, only when the outputs of these filters and the actual lateral acceleration satisfy respective specified conditions, the road friction coefficient maximum value $\mu_{max}$ is obtained from either of these filter outputs and the actual lateral acceleration. In this point, the fourth embodiment differs from the third embodiment.

Figure 11:
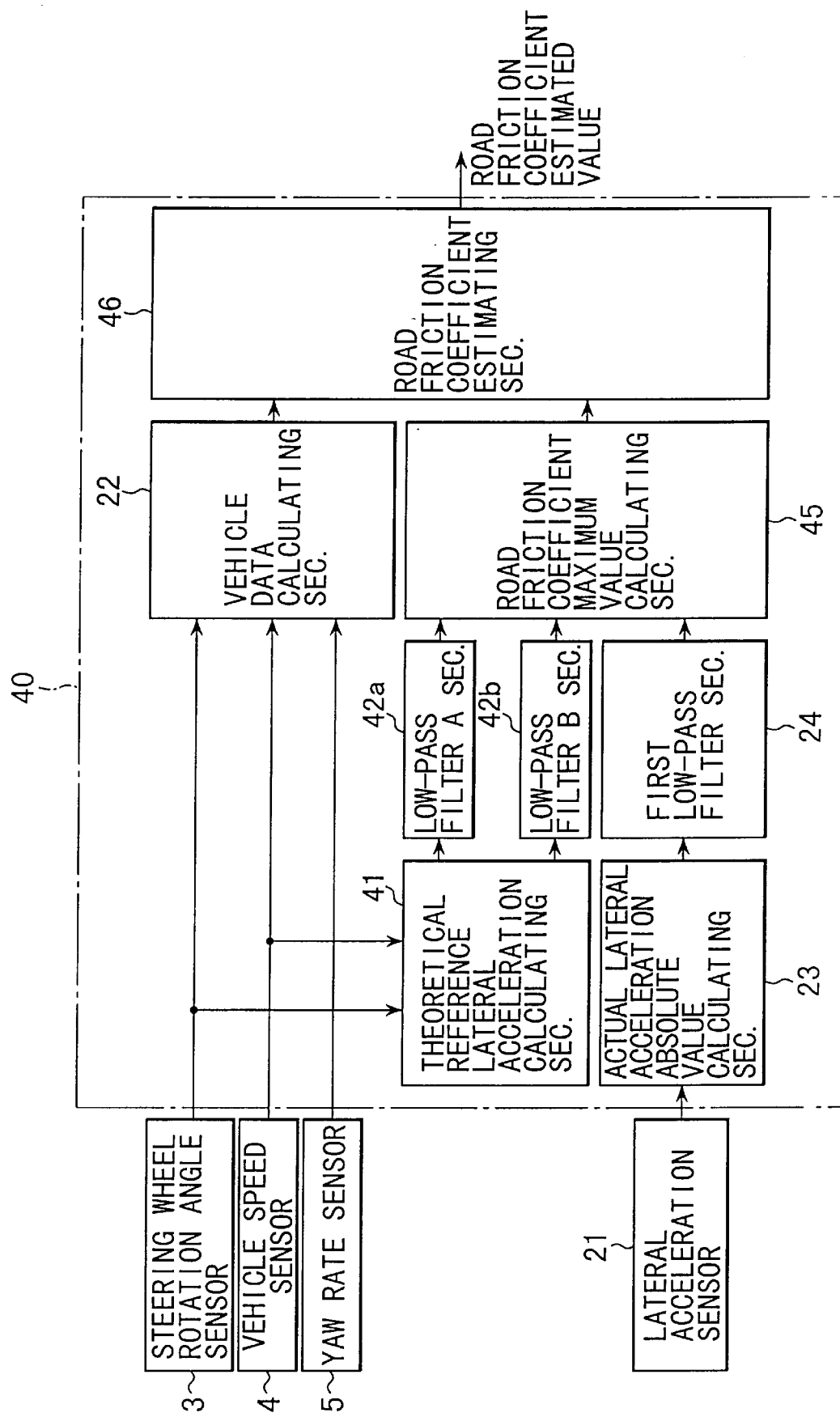
FIG. 11 is a functional block diagram of a road friction coefficient apparatus according to a fourth embodiment of the present invention.

Referring to FIG. 11, a road friction coefficient detecting apparatus 40 receives signals from a steering wheel rotation angle sensor 3, a vehicle speed sensor 4, a yaw rate sensor 5 and a lateral acceleration sensor 21 and detects the road friction coefficient estimated value E based on these signals.

The road friction coefficient detecting apparatus 40 comprises a vehicle data calculating section 22, a theoretical lateral acceleration calculating section 41, a low-pass filter A section 42a, a low-pass filter B section 42b, a lateral acceleration absolute value calculating section 23, a first low-pass filter section 24, a road friction coefficient maximum value calculating section 45 and a road friction coefficient estimating section 46.

The vehicle data calculating section 22 forms a vehicle data calculating means which receives detecting data from the steering wheel rotation angle sensor 3, the vehicle speed sensor 4 and the yaw rate sensor 5 and estimates parameters a, b from the steering wheel rotation angle $\theta_H$, the vehicle speed V and the yaw rate $\gamma$ using the adaptive control theory in the same manner as in the aforesaid second and third embodiments.

The theoretical reference lateral acceleration calculating section 41, the low-pass filter A section 42a, the low-pass filter B section, the lateral acceleration absolute value calculating section 23, the first low-pass filter section 24 and the reference lateral acceleration calculating section 41 form a road friction coefficient reference value calculating means.

The theoretical reference lateral acceleration calculating section 41 receives steering wheel rotation angle ($\theta_H$) indicative data and vehicle speed (V) indicative data from the steering wheel rotation angle sensor 3 and the vehicle speed sensor 4, respectively and calculates a theoretical reference lateral acceleration based on these data.

The respective low-pass filter A section 42a and low-pass filter B section apply the low-pass filter process to the theoretical reference lateral acceleration data calculated in the theoretical reference lateral acceleration calculating section 41 with respective different time constants reflecting the responsibility of the vehicle to output noise-free reference lateral acceleration data to the road friction coefficient maximum value calculating section 45. Hereinafter, the reference lateral acceleration outputted from the low-pass filter A section 42a is referred to as "output filter A" and the one outputted from the low-pass filter B section 42b is referred to as "output filter B".

Figure 12:
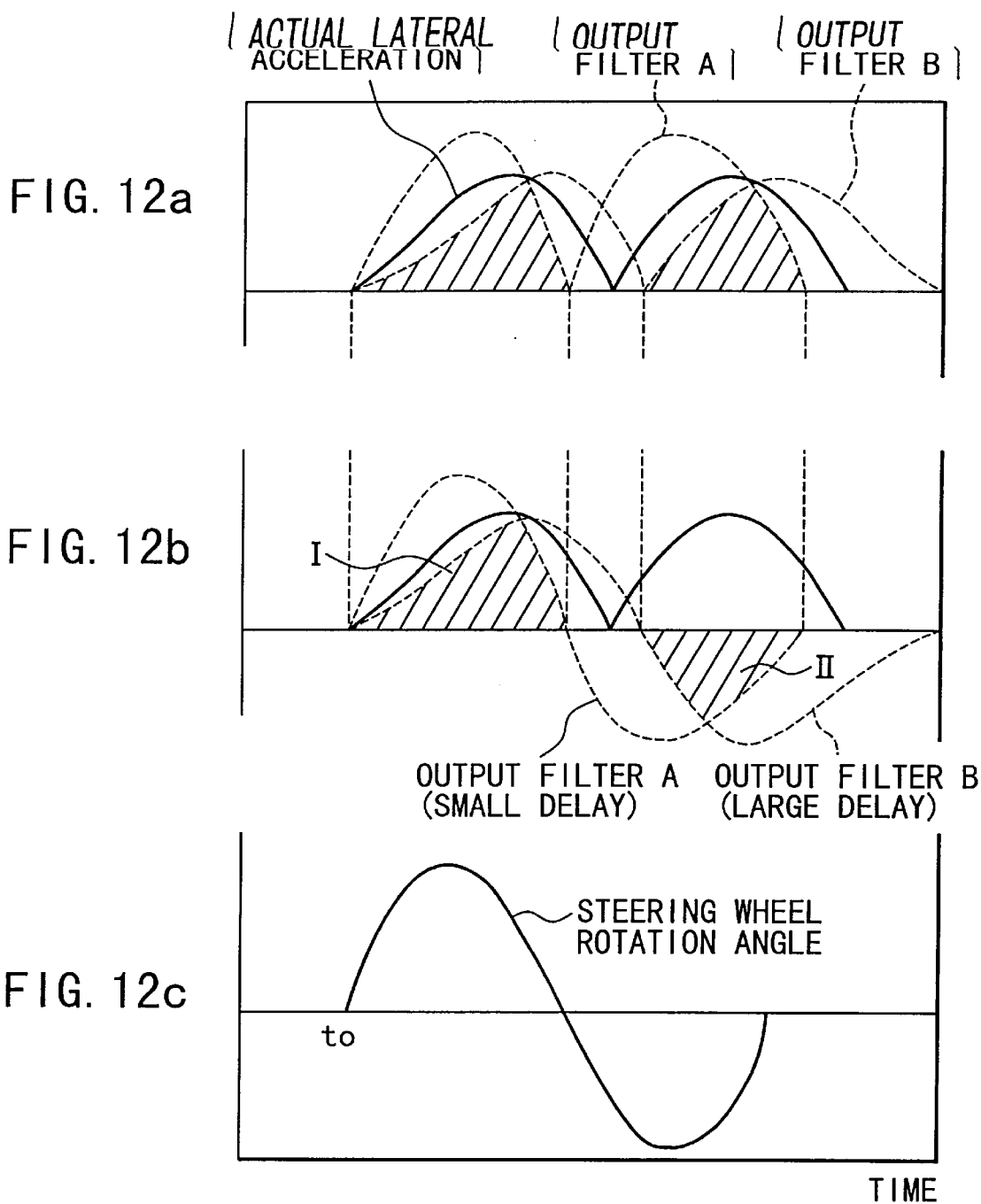
FIGS. 12a, 12b, 12c are an explanatory view showing a calculation area of a road friction coefficient maximum value according to a fourth embodiment of the present invention.

For example, when the- steering wheel is operated as shown in FIG. 12c, the respective reference lateral accelerations, i.e., an output filter A and an output filter B, responsive to the steering operation are as shown in FIG. 12b. The output filter A shows a relatively small delay due to a small time constant inherent to the low-pass filter A section and the output filter B shows a relatively large delay due to a large time constant inherent to the low-pass filter B section.

The lateral acceleration absolute value calculating section 23 receives data indicative of an actual lateral acceleration from the lateral acceleration sensor 21 and calculates an absolute value of the actual lateral acceleration.

The first low-pass filter section 24 receives data indicative of the actual lateral acceleration absolute value and applies the low-pass filter process to the data to remove noises contained in the data.

The road friction coefficient maximum value calculating section 45 calculates a road friction coefficient maximum value $\mu_{max}$ based on output signals from the low-pass filter A section 42a, the low-pass filter B section 42b and the first low-pass filter section 24, only when the actual lateral acceleration is not within a specified range.

Describing the calculation of the road friction coefficient maximum value $\mu_{max}$ in detail, first road friction coefficient maximum values $\mu A$ and $\mu B$ are calculated respectively according to the following formulas:

$$\mu A = |\text{actual lateral acceleration}|/|\text{output filter } A| \qquad (14)$$

$$\mu B = |\text{actual lateral acceleration}|/|\text{output filter } B| \qquad (15)$$

Then, when the output filter A, the output filter B and the absolute value of the actual lateral acceleration satisfy specified conditions, $\mu A$ is compared with $\mu B$ and the smaller one is established as a road friction coefficient maximum value max $\mu_{max}$.

Here, the case where the specified conditions are satisfied is a case where the output filter A and the output filter B have the same plus or minus signs. In an area where signs are different, filter outputs are small and consequently the effects of noises of sensors, zero point shifts of those and the like become relatively large, resulting in decreasing the reliability of the road friction coefficient maximum value. In FIG. 12b, hatched areas I and II satisfy the above specified conditions.

The road friction coefficient estimating section 46 forms a road friction coefficient calculating means for calculating a road friction coefficient estimated value E based on the parameters a, b estimated in the vehicle data calculating section 22 and the road friction coefficient maximum value $\mu_{max}$ calculated in the road friction coefficient maximum value calculating section 45.

That is, in the road friction coefficient estimating section 46, first cornering powers $K_f$, $K_r$ are calculated based on the parameters a, b and a mid-estimated road friction coefficient $\mu_k$ is obtained. Then, when the road friction coefficient maximum value $\mu_{max}$ is calculated in the road friction coefficient maximum value calculating section 45 and inputted to the road friction coefficient estimating section 46, the mid-estimated road friction coefficient $\mu_k$ is compared with this road friction coefficient maximum value $\mu_{max}$ and the smaller one is selected as a road friction coefficient estimated value E. On the other hand, in case where the road friction coefficient maximum value $\mu_{max}$ has not been calculated in the road friction coefficient maximum value calculating section 45, the mid-estimated road friction coefficient $\mu_k$ is established as a road friction coefficient estimated value E.

Figure 13:
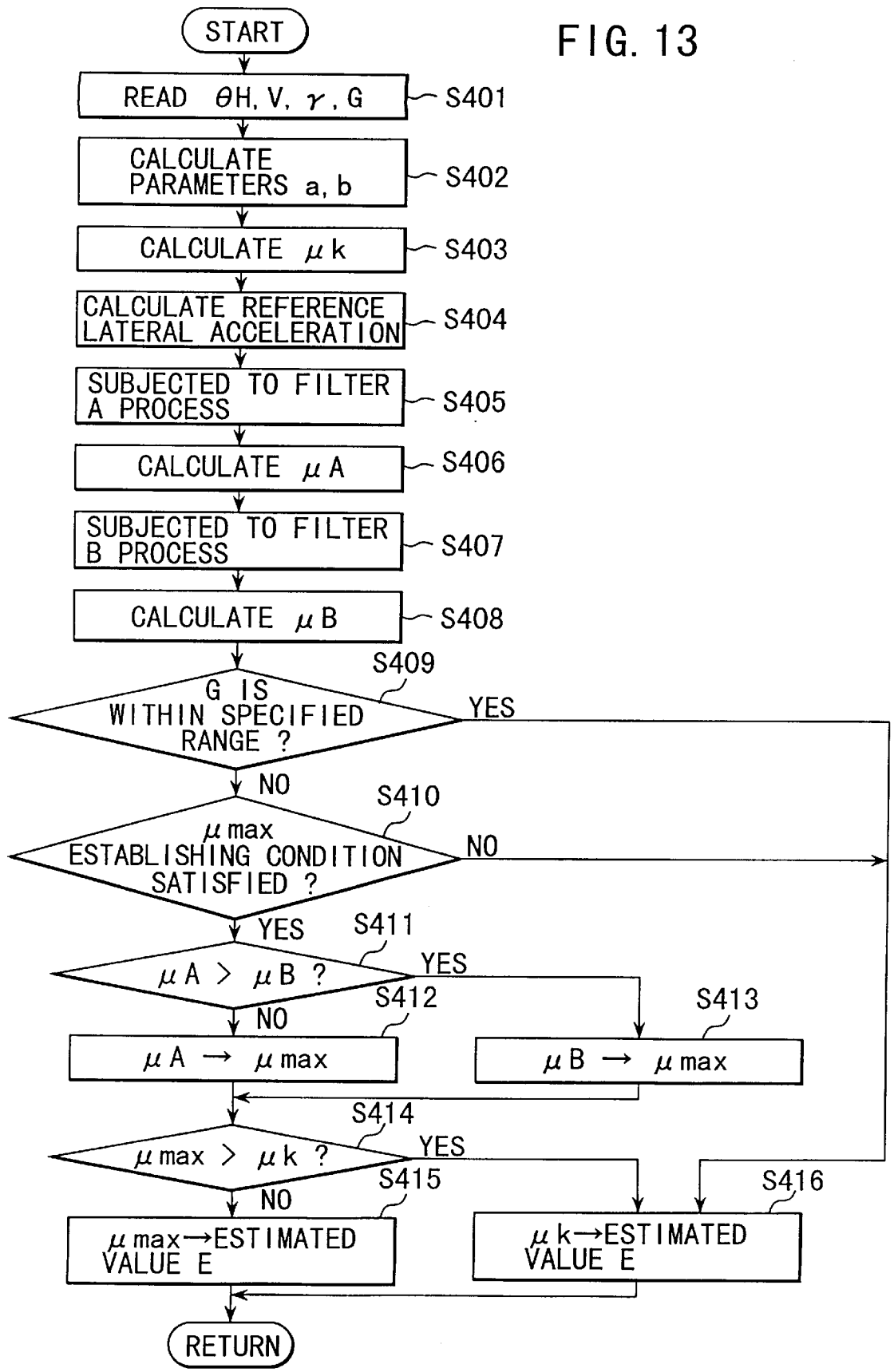
FIG. 13 is a flowchart of a routine for calculating a road friction coefficient according to a fourth embodiment of the present invention.

Next, the detection process of the road friction coefficient in thus constituted road friction coefficient detecting apparatus 40 will be described according to a flowchart of FIG. 13.

This detecting program is carried out every specified time. When the program starts, at a step S401 steering wheel rotation angle ($\theta_H$) indicative data, vehicle speed (V) indicative data, yaw rate ($\gamma$) indicative data and lateral acceleration (G) indicative data are read from the steering wheel rotation angle sensor 3, the vehicle speed sensor 4, the yaw rate sensor 5 and the lateral acceleration sensor 21, respectively and the program goes to a step S402.

At the step S402, in the vehicle data calculating section 22, parameters a, b are obtained from the data of the steering wheel rotation angle $\theta_H$, the vehicle speed V and the yaw rate $\gamma$ and then the program goes to a step S403.

At the step S403, in the road friction coefficient estimating section 46, cornering powers $K_f$, $K_r$ are obtained from the parameters a, b and based on the cornering powers $K_f$, $K_r$, a mid-estimated road friction coefficient $\mu_k$ is calculated.

Then, the program goes to a step S404 wherein in the theoretical reference lateral acceleration calculating section 41 a reference lateral acceleration is obtained from the steering wheel rotation angle $\theta_H$ and the vehicle speed V.

Then, the program goes to a step S405 where in the low-pass filter A section 42a the theoretical reference lateral acceleration is subjected to the low-pass filter A process to obtain the output filter A. After that, at a step S406, the road friction coefficient maximum value $\mu$A is calculated according to the formula 14 based on the absolute value of the output filter A and the absolute value of the actual lateral acceleration.

Further, at a step S407, in the low-pass filter B section 42b the theoretical reference lateral acceleration is subjected to the low-pass filter B process to obtain the output filter B. After that, at a step S408, the road friction coefficient maximum value $\eta$B is calculated according to the formula 15 based on the absolute value of the output filter B and the absolute value of the actual lateral acceleration and the program goes to a step S409.

At the step S409, it is judged whether or not the actual lateral acceleration is within a specified range, that is, a range enclosed by the output filter A and the output filter B. If the actual lateral acceleration is within that specified range, the program skips to a step S416 and if otherwise the program goes to a step S410.

At the step S410, it is judged whether or not the output filter A and the output filter B satisfy the establishing condition of the road friction coefficient $\mu_{max}$. If those satisfy that condition, the program goes to a step S411 and if otherwise, the program skips to the step S416.

At the step S411, the road friction coefficient maximum value $\mu$A calculated at S406 is compared with the road friction coefficient maximum value $\mu$B calculated at S408. If the road friction coefficient maximum value $\mu$B is larger than the road friction coefficient maximum $\mu$A, the program goes to a step S412 where the road friction coefficient maximum value $\mu$A is set to the road friction coefficient maximum value $\mu_{max}$ and if the road friction coefficient maximum value $\mu$A is larger than the road friction coefficient maximum $\mu$B, the program goes to a step S413 where the road friction coefficient maximum value $\mu$B is set to the road friction coefficient maximum value $\mu_{max}$.

Next, the program goes to a step S414 where the road friction coefficient $\mu_{max}$ which is established at S412 or S413 is compared with the mid-estimated road friction coefficient $\mu_k$. If $\mu_k$ is larger than $\mu_{max}$, the program goes to a step S415 where the road friction coefficient maximum value $\mu_{max}$ is established as a road friction coefficient estimated value E and the program leaves the routine.

On the other hand, in case where at the step S409 the actual lateral acceleration is within the range enclosed by the output filter A and the output filter B, or in case where at the step S410 the output filter A and the output filter B do not satisfy the establishing condition of the road friction coefficient $\mu_{max}$, or in case where at the step S414 the road friction coefficient $\mu_{max}$ is larger than the mid-estimated road friction coefficient $\mu_k$, the program skips to the step S416 where the mid-estimated road friction coefficient $\mu_k$ is established as a road friction coefficient estimated value E and after that the program leaves the routine.

Thus, according to the fourth embodiment, in addition to the feature of the third embodiment, since two kinds of low-pass filters having different time constants form respective reference lateral accelerations (output filter A and output filter B) reflecting the responsibility of the actual vehicle and when the actual lateral acceleration does not enter between these two outputs, the road friction coefficient $\mu_{max}$ is obtained based on these data and the actual lateral acceleration, the road friction coefficient $\mu_{max}$ can take a more accurate value without making time-consuming calculation.

In summary, according to the present invention, since the parameter initial values closer to parameters corresponding to the actual road friction coefficient can be established, it is possible to reduce the time for converging the road friction coefficient and to enhance the responsibility of the road friction coefficient detecting apparatus.

Further, since the road friction coefficient is estimated by comparing the road friction coefficient obtained based on the actual lateral acceleration with the road friction coefficient calculated based on the vehicle speed, the steering angle and the yaw rate, the detecting error of the road friction coefficient can be minimized.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A road friction coefficient detecting apparatus of a vehicle having a vehicle motion data detecting means for detecting lateral motion indicative data of said vehicle and a road surface condition data detecting means for detecting road surface condition indicative data, comprising:

a vehicle data calculating means for calculating parameters to estimate respective cornering powers of front and rear wheels of said vehicle according to an equation of motion on the basis of said lateral motion indicative data;

a road friction coefficient estimating means for estimating said cornering powers of front and rear wheels based on said parameters and for calculating a road friction coefficient estimated value based on said cornering powers; and a tire characteristic initial value judging means for estimating a road surface condition based on said road surface condition indicative data when it is judged that said vehicle starts up after a long period of rest and for outputting a signal to establish an initial value of said parameters to said vehicle data calculating means.

2. The road friction coefficient detecting apparatus according to claim 1, wherein said tire characteristic initial value judging means establishes an initial value of said parameters corresponding to a predetermined low road friction coefficient when said road surface condition indicative data estimate a road surface with low friction coefficient.

3. A road friction coefficient detecting apparatus of a vehicle having a vehicle motion data detecting means for detecting lateral motion indicative data of said vehicle and a lateral acceleration sensor for detecting actual lateral acceleration indicative data of said vehicle, comprising:

a vehicle data calculating means for calculating parameters to estimate respective cornering powers of front and rear wheels of said vehicle according to an equation of motion on the basis of said lateral motion indicative data;

a road friction coefficient reference value calculating means for applying a low-pass filter process to said actual lateral acceleration indicative data and for calculating a road friction coefficient reference value based on said low-pass filter processed data; and a road friction coefficient estimating means for estimating respective cornering powers of front and rear wheels based on said parameters calculated in said vehicle data calculating means and for calculating a road friction coefficient mid-estimated value based on said cornering powers and for establishing a road friction coefficient estimated value by comparing said road friction coefficient mid-estimated value with said road friction coefficient reference value.

4. The road friction coefficient detecting apparatus according to claim 2, wherein said road friction coefficient reference value calculating means calculates a road friction coefficient minimum value at least existing on a road surface based on said low-pass filter processed data of lateral acceleration, and said road friction coefficient estimating means establishes said road friction coefficient reference value as a road friction coefficient estimated value when said road friction coefficient mid-estimated value calculated from said cornering powers is smaller than said road friction coefficient reference value.

5. The road friction coefficient detecting apparatus according to claim 3, said road friction coefficient reference value calculating means calculates a theoretical reference lateral acceleration theoretically obtained from said lateral motion indicative data, produces a reference lateral acceleration by applying said low-pass filter process to said theoretical reference lateral acceleration and calculates a maximum value of road friction coefficient as said road friction coefficient reference value based on said reference lateral acceleration and said low-pass filter processed data of lateral acceleration, and said road friction coefficient estimating means establishes said road friction coefficient reference value as a road friction coefficient estimated value when said road friction coefficient mid-estimated value calculated from said cornering powers is larger than said road friction coefficient reference value.

6. The road friction coefficient detecting apparatus according to claim 3, wherein said road friction coefficient reference value calculating means calculates a theoretical reference lateral acceleration theoretically obtained from said lateral motion indicative data and calculates two different reference lateral accelerations by applying said low-pass filter process to said theoretical reference lateral acceleration using two kinds of low-pass filters, and said road friction coefficient estimating means establishes said road friction coefficient mid-estimated value calculated from said cornering powers as a road friction coefficient estimated value, if said filter-processed actual lateral acceleration exists between said two different reference lateral accelerations.

7. The road friction coefficient detecting apparatus according to claim 3, wherein said road friction coefficient reference value calculating means calculates a theoretical reference lateral acceleration theoretically obtained from said lateral motion indicative data, calculates two different reference lateral accelerations by applying said low-pass filter process to said theoretical reference lateral acceleration using two kinds of low-pass filters, obtains two different road friction coefficient maximum values based on said two different reference lateral accelerations and said filter-processed actual lateral acceleration and establishes a smaller one of said two different road friction coefficient maximum values as a road friction coefficient reference value when said filter-processed actual lateral acceleration satisfies a condition determined by said two different reference lateral accelerations, and said road friction coefficient estimating means establishes said road friction coefficient reference value as a road friction coefficient estimated value when said road friction coefficient mid-estimated value calculated from said cornering powers is larger than said road friction coefficient reference value.

8. A road friction coefficient detecting apparatus of a vehicle having a vehicle motion data detecting means for detecting lateral motion indicative data of said vehicle, a lateral acceleration sensor for detecting actual lateral acceleration indicative data of said vehicle and a road surface condition data detecting means for detecting road surface condition indicative data, comprising:

a vehicle data calculating means for calculating parameters to estimate respective cornering powers of front and rear wheels of said vehicle according to an equation of motion on the basis of said lateral motion indicative data;

a tire characteristic initial value judging means for estimating a road surface condition based on said road surface condition indicative data when it is judged that said vehicle starts up after a long period of rest and for outputting a signal to establish an initial value of said parameters to said vehicle data calculating means;

a road friction coefficient reference value calculating means for applying a low-pass filter process to said actual lateral acceleration indicative data and for calculating a road friction coefficient reference value based on said low-filter processed data; and a road friction coefficient estimating means for estimating respective cornering powers of front and rear wheels based on said parameters calculated in said vehicle data calculating means and for calculating a road friction coefficient mid-estimated value based on said cornering powers and for establishing a road friction coefficient estimated value by comparing said road friction coefficient mid-estimated value with said road friction coefficient reference value.

9. The road friction coefficient detecting apparatus according to claim 8, wherein said tire characteristic initial value judging means establishes an initial value of said parameters corresponding to a predetermined low road friction coefficient when said road surface condition indicative data estimate a road surface with low friction coefficient.

10. The road friction coefficient detecting apparatus according to claim 8, wherein said road friction coefficient reference value calculating means calculates a minimum value of road friction coefficient at least existing on a road surface based on said low-pass filter processed data of lateral acceleration, and said road friction coefficient estimating means establishes said road friction coefficient reference value as a road friction coefficient estimated value when said road friction coefficient mid-estimated value calculated from said cornering powers is smaller than said road friction coefficient reference value.

11. The road friction coefficient detecting apparatus according to claim 8, said road friction coefficient reference value calculating means calculates a theoretical reference lateral acceleration theoretically obtained from said lateral motion indicative data, calculates a reference lateral acceleration by applying said low-pass filter process to said theoretical reference lateral acceleration and calculates a maximum value of road friction coefficient as said road friction coefficient reference value based on said reference lateral acceleration and said low-pass filter processed data of lateral acceleration, and said road friction coefficient estimating means establishes said road friction coefficient reference value as a road friction coefficient estimated value when said road friction coefficient mid-estimated value calculated from said cornering powers is larger than said road friction coefficient reference value.

12. The road friction coefficient detecting apparatus according to claim 8, wherein said road friction coefficient reference value calculating means calculates a theoretical reference lateral acceleration theoretically obtained from said lateral motion indicative data and calculates two different reference lateral accelerations by applying said low-pass filter process to said theoretical reference lateral acceleration using two kinds of low-pass filters, and said road friction coefficient estimating means establishes said road friction coefficient mid-estimated value calculated from said cornering powers as a road friction coefficient estimated value, if said filter-processed actual lateral acceleration exists between said two different reference lateral accelerations.

13. The road friction coefficient detecting apparatus according to claim 8, wherein said road friction coefficient reference value calculating means calculates a theoretical reference lateral acceleration theoretically obtained from said lateral motion indicative data, calculates two different reference lateral accelerations by applying said low-pass filter process to said theoretical reference lateral acceleration using two kinds of low-pass filters, obtains two different road friction coefficient maximum values based on said two different reference lateral accelerations and said filter-processed actual lateral acceleration and establishes a smaller one of said two different road friction coefficient maximum values as a road friction coefficient reference value when said filter-processed actual lateral acceleration satisfies a condition determined by said two different reference lateral accelerations, and said road friction coefficient estimating means establishes said road friction coefficient reference value as a road friction coefficient estimated value when said road friction coefficient mid-estimated value calculated from said cornering powers is larger than said road friction coefficient reference value.

14. A method of detecting a road friction coefficient of a vehicle having a vehicle motion data detecting means for detecting lateral motion indicative data of said vehicle and a road surface condition data detecting means for detecting road surface condition indicative data, comprising the steps of:

calculating parameters to estimate respective cornering powers of front and rear wheels of said vehicle according to an equation of motion on the basis of said lateral motion indicative data;

estimating said cornering powers of front and rear wheels based on said parameters and calculating a road friction coefficient estimated value based on said cornering powers; and estimating a road surface condition based on said road surface condition indicative data when it is judged that said vehicle starts up after a long period of rest and outputting a signal to establish an initial value of said parameter.

15. A method of detecting a road friction coefficient of a vehicle having a vehicle motion data detecting means for detecting lateral motion indicative data of said vehicle and a lateral acceleration sensor for detecting actual lateral acceleration indicative data of said vehicle, comprising the steps of:

calculating parameters to estimate respective cornering powers of front and rear wheels of said vehicle according to an equation of motion on the basis of said lateral motion indicative data;

applying a low-pass filter process to said actual lateral acceleration indicative data and for calculating a road friction coefficient reference value based on said low-pass filter processed data; and estimating respective cornering powers of front and rear wheels based on said parameters and calculating a road friction coefficient mid-estimated value based on said cornering powers and for establishing a road friction coefficient estimated value by comparing said road friction coefficient mid-estimated value with said road friction coefficient reference value.

16. A method of detecting a road friction coefficient of a vehicle having a vehicle motion data detecting means for detecting lateral motion indicative data of said vehicle, a lateral acceleration sensor for detecting actual lateral acceleration indicative data of said vehicle and a road surface condition data detecting means for detecting road surface condition indicative data, comprising the steps of:

calculating parameters to estimate respective cornering powers of front and rear wheels of said vehicle according to an equation of motion on the basis of said lateral motion indicative data;

estimating a road surface condition based on said road surface condition indicative data when it is judged that said vehicle starts up after a long period of rest and outputting a signal to establish an initial value of said parameters;

applying a low-pass filter process to said actual lateral acceleration indicative data and calculating a road friction coefficient reference value based on said low-filter processed data; and estimating respective cornering powers of front and rear wheels based on said parameters and calculating a road friction coefficient mid-estimated value based on said cornering powers and establishing a road friction coefficient estimated value by comparing said road friction coefficient mid-estimated value with said road friction coefficient reference value.

* * * * *